Patented June 15, 1937

2,083,554

UNITED STATES PATENT OFFICE 2,083,554

CELLULOSE ETHERS

Louis H. Bock and Alva L. Houk, Philadelphia, Pa., assignors to Röhm & Haas Company, Philadelphia, Pa.

No Drawing. Application June 24, 1936, Serial No. 86,986

9 Claims. (Cl. 260—152)

This invention relates to a new class of cellulose ethers and to a process of preparing them.

These new cellulose ethers are compounds that may be obtained by etherifying cellulose with a halogen derivative of an acetal having the generic formula

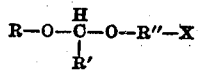

wherein R is an alkyl group, R' is a hydrogen atom or an alkyl group, R'' is a hydrocarbon group containing at least two carbon atoms, and X is a halogen at least two carbon atoms removed from the oxygen atom.

Cellulose, according to the present day understanding of its composition, is a high molecular weight, long chain compound having the formula $$(C_6H_{10}O_5)_x$$

in which there are three hydroxyl groups present for each six carbon atoms. Chemically it is very unreactive. It is soluble in only a few special solvents, most of which degenerate the molecule in dissolving it. It has heretofore been proposed to modify cellulose and thereby render it more soluble in the common solvents by etherifying the hydroxyl groups. There are two common processes of accomplishing this. One is to degrade the cellulose to the extent that it becomes soluble in caustic alkali solution and then treat the alkali solution of degraded cellulose with an etherifying agent. The other is to treat undissolved, undegraded cellulose with an etherifying agent in the presence of alkali and to repeat this treatment until sufficient etherification is obtained.

The first of these processes has the distinct disadvantage that it is necessary to degrade to a considerable degree the cellulose before it can be etherified. The ethers made by this process are however, more readily soluble than those made by the second. In the second process the cellulose must be treated in an undissolved state and because of its long chain it is difficult to get uniform etherification except by reacting upon a very large number of the hydroxyl groups. When only a few alkyl groups are introduced they enter only at the exterior portion of the cellulose fiber. The result is a cellulose molecule alkylated at only a few isolated spots. The length of unalkylated chain, however, prevents the whole molecule from partaking of the properties of cellulose ethers. Ethers made by this method are rendered soluble in common solvents only by the introduction of a relatively large number of alkyl groups. For this reason the etherification must be repeated numerous times. In both of these processes, large excesses of alkylating agent are needed. Of the various chemicals used in the reaction, the alkylating agents are the most expensive and since the portion that does not react with the cellulose is destroyed by hydrolysis, the costs of preparation are unduly high.

The object of the present invention is to prepare cellulose ethers of improved solubility in the common solvents. A further object is the development of a process for the manufacture of cellulose ethers that can be practiced with the use of smaller excesses of etherifying agents. A further object is the preparation of soluble cellulose ethers of low degree of etherification. A still further object is the preparation of cellulose ethers from undegraded cellulose having a low degree of etherification and in which the ether groups are distributed uniformly throughout the molecule. It is also an object to prepare a new class of cellulose ethers. Other objects will appear from the following description.

In our present invention we accomplish these objects by etherifying cellulose with halogen derivatives of acetals in which the halogen atom is at least two carbon atoms removed from the closest oxygen atom and is preferably attached to the second or third carbon atom. The position of the acetal group with respect to the halogen atom has a great effect upon the chemical reactivity of these compounds. When the halogen atom is removed by but a single carbon atom from the closest oxygen, its reactivity is such that large quantities of the compound are hydrolyzed in the process of etherifying cellulose. As the halogen atom is further removed, its reactivity becomes progressively less. When positioned two or three carbon atoms away it is highly reactive toward cellulose but not so readily hydrolyzed. The increased activity of this class of compounds also makes available for etherification with cellulose a group of aliphatic compounds having longer chain length than have heretofore been introduced. Long chain alkyl esters of inorganic acids as a class are too unreactive to be useful for the preparation of cellulose ethers.

The acetal grouping

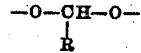

is hydrophilic in nature and tends to impart to cellulose ethers containing it a high degree of water solubility. By distributing such groupings uniformly throughout a cellulose molecule, water soluble cellulose ethers having a very low degree of etherification can be obtained. In the copending application of Donald H. Powers, Louis H. Bock and Alva L. Houk, Serial No. 750,128 filed October 25, 1934, there is disclosed a method of preparing ethers of undegraded cellulose by dissolving cellulose in quaternary ammonium hydroxides and treating it with alkylating agents. That method produces ethers of undegraded cellulose in which the ether groups are distributed uniformly throughout the molecule. By using in the process of that application the lower molecular weight etherifying agents of the class herein disclosed, water soluble ethers of undegraded cellulose can be made that contain as low as 0.25 substituted groups to each $C_6H_{10}O_5$ unit. While we prefer to use that process in the preparation of the new cellulose ethers, it is to be understood that the etherifying agents herein disclosed can be used in any of the common processes of making cellulose ethers.

The etherifying agents we use can be prepared in known manner by reacting an aldehyde R'CHO, an alcohol R—OH and an olefine halohydrin HO—R''—X. An improved method of carrying out this reaction to obtain larger yields of the desired mixed acetal is disclosed in the copending application of William F. Hester and Louis H. Bock, Serial No. 80,140 filed May 16, 1936. Among the agents that can be used in our invention are the following—$\beta$-chloroethyl-methyl formal, $\beta$-chloroethyl-ethyl formal, $\beta$-chloroethyl-amyl formal, $\beta$-chloroethyl-capryl formal, $\beta$-chloroethyl-methyl butanal, $\gamma$-chloropropyl-methyl formal, $\beta$-chloroethyl-methyl acetal, and the corresponding bromine derivatives, as well as similar compounds made with other aldehydes.

The following examples are given to illustrate how our invention is carried out. These examples should not however be construed as a limitation.

*Example 1.*—A mixture of 165 g. of bleached sulfite cellulose and one liter of a 39% solution of trimethylbenzyl ammonium hydroxide was prepared in a Werner and Pfleiderer mixer equipped with a steam jacket. The mass was mixed at 75–100° C. for 1¾ hours, cooled to 60° C. and 186 g. of $\beta$-chloroethyl-methyl formal added over a period of two hours while stirring continuously. The mass was then heated at 80° C. for three hours and at the end of this time it was a smooth, viscous syrup with a little unreacted alkylating agent floating on top. It was cooled by running cold water through the jacket of the mixer and the excess quaternary ammonium hydroxide was neutralized (litmus) by adding 50% acetic acid. The cellulose ether remained in solution. It was precipitated as a gelatinous mass by the gradual addition of 1.5 liters of acetone, filtered, washed several times with acetone to remove the quaternary ammonium acetate, and dried in an oven at 80° C. Analysis for formaldehyde by an adaptation of the method of Friedemann and Kendall, Jour. Biol. Chem. 32, 23 (1929), gave 5.2% formaldehyde which corresponds to 0.33 groups introduced to each $C_6H_{10}O_5$ unit. The product dissolved slowly in water to form a smooth, viscous solution. By evaporating this solution tough elastic films were obtained.

*Example 2.*—A one-liter flask, equipped with stirrer, was charged with 32 g. of bleached sulfite cellulose and 400 ml. of a 39% solution of trimethylbenzyl ammonium hydroxide. The mass was stirred at room temperature for one hour, heated gradually to 85° C. over a period of two more hours, and cooled to 30° C. 133.5 g. of $\beta$-chloroethyl-ethyl formal was added over a period of 3 hours at 30–35° C., the temperature raised to 50° C. and held there for 17 hours. The reaction mixture was neutralized with 20% acetic acid and the cellulose ether precipitated by the addition of one liter of acetone. It was washed several times with acetone and dried in an oven at 75° C. The product was soluble in water to form a viscous solution. Analysis gave 4.75% formaldehyde which corresponds to 0.30 groups introduced to each $C_6H_{10}O_5$ unit.

*Example 3.*—To a solution of 10 g. of bleached sulfite cellulose in 125 ml. of a 39% solution of trimethylbenzyl ammonium hydroxide was added 37 g. of $\gamma$-chloropropyl-methyl formal. Stirring was continued for two days, after which the reaction mixture was neutralized by the addition of 20% acetic acid. The product precipitated and was washed with water. When dry it was soluble in 8% sodium hydroxide to form a viscous solution. This solution is useful in coating fabrics and in forming films since it is precipitated by dilute acids. Analysis gave 1.30% formaldehyde which corresponds to 0.07 groups to each $C_6H_{10}O_5$ unit.

*Example 4.*—To a cellulose solution prepared as in Example 2, was added 132 g. of $\beta$-chloroethyl-capryl formal and stirring was continued at 70° C. for 4 hours. The product precipitated during the reaction. It was washed with water and dried. The product was insoluble in water, dilute sodium hydroxide and in trimethylbenzyl ammonium hydroxide solution.

*Example 5.*—By reacting 165 g. of bleached sulfite cellulose, one liter of a 39% solution of trimethylbenzyl ammonium hydroxide and 540 g. of $\beta$-chloroethyl-amyl formal as described in Example 1 an insoluble white powder was obtained. Analysis gave 5.2% formaldehyde which corresponds to 0.40 groups to each $C_6H_{10}O_5$ unit. This partially alkylated material was then realkylated by heating it in an autoclave at 125° C. for 6 hours with 500 g. of 10% sodium hydroxide and 500 g. of $\beta$-chloroethyl-amyl formal. The product was an insoluble white powder which gave 8.74% formaldehyde by analysis corresponding to 0.81 groups introduced to each $C_6H_{10}O_5$ unit. Realkylation of this material in the autoclave in the presence of powdered caustic gave a product analyzing 110% formaldehyde corresponding to 1.25 groups to each $C_6H_{10}O_5$ unit. This last product was swollen by toluene or benzene to a plastic mass. Further etherification leads to a benzene soluble product.

In each of the above examples any of the other etherifying agents herein disclosed, either alone, or in admixture, or in admixture with etherifying agents heretofore known in the art, may be used. It is also apparent to those skilled in the art that mixed ethers can be prepared by a series of etherifications using different alkylating agents. For example, a water soluble cellulose ether can be prepared by the process described in Example 1 and the product thus obtained further etherified with common alkylating agents, such as dimethyl sulphate, ethyl chloride, benzyl chloride, ethylene chlorhydrin, etc.

We have described our invention with particular reference to the preparation of ethers of undisintegrated cellulose. It is apparent however, that it is as equally applicable to the ethers of regenerated and other types of disintegrated cellulose.

We claim:
1. A cellulose ether containing the group

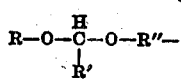

wherein R is an alkyl group, R' is a hydrogen atom or an alkyl group, and R'' is a hydrocarbon group containing at least two carbon atoms.

2. A cellulose ether containing the group

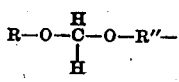

wherein R is an alkyl group, and R'' is a hydrocarbon group containing at least two carbon atoms.

3. A cellulose ether containing the group

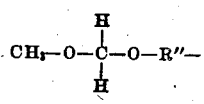

wherein R'' is a hydrocarbon group containing at least two carbon atoms.

4. A cellulose ether containing the group

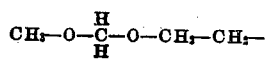

5. A cellulose ether containing the group

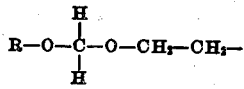

wherein R is an alkyl group.

6. A cellulose ether containing the group

7. A cellulose ether containing the group

8. The process of producing cellulose ethers which comprises dissolving cellulose in an aqueous solution of a quaternary ammonium hydroxide and treating the dissolved cellulose with a halogen derivative of an acetal having the general formula

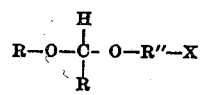

wherein R is an alkyl group, R' is a hydrogen atom or an alkyl group, R'' is a hydrocarbon group containing at least two carbon atoms, and X is a halogen atom at least two carbon atoms removed from the closest oxygen atom.

9. The process of producing cellulose ethers which comprises dissolving cellulose in an aqueous solution of a quaternary ammonium hydroxide and treating the dissolved cellulose with a halogen derivative of an acetal having the general formula

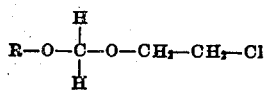

wherein R is an alkyl group.

LOUIS H. BOCK.
ALVA L. HOUK.